(12) United States Patent
Welches

(10) Patent No.: US 6,567,283 B2
(45) Date of Patent: May 20, 2003

(54) ENHANCED CONDUCTION ANGLE POWER FACTOR CORRECTION TOPOLOGY

(75) Inventor: Richard Shaun Welches, Amherst, NH (US)

(73) Assignee: Youtility Inc., Hudson, NH (US)

( * ) Notice: Subject to any disclaimer, the term of this patent is extended or adjusted under 35 U.S.C. 154(b) by 0 days.

(21) Appl. No.: 10/118,618

(22) Filed: Apr. 1, 2002

(65) Prior Publication Data

US 2002/0181258 A1 Dec. 5, 2002

Related U.S. Application Data

(60) Provisional application No. 60/280,253, filed on Mar. 30, 2001.

(51) Int. Cl.$^7$ ............................................. H02M 7/217
(52) U.S. Cl. ........................................... 363/89; 363/48
(58) Field of Search ............................. 363/44, 45, 47, 363/48, 89, 126

(56) References Cited

U.S. PATENT DOCUMENTS

| 4,940,929 A |   | 7/1990  | Williams |        |
|-------------|---|---------|----------|--------|
| 5,019,952 A |   | 5/1991  | Smolenski et al. | |
| 5,047,912 A | * | 9/1991  | Pelly    | 363/89 |
| 5,235,504 A | * | 8/1993  | Sood     | 363/89 |
| 5,414,613 A | * | 5/1995  | Chen     | 363/89 |
| 5,793,190 A |   | 8/1998  | Sahlstom et al. | |
| 5,793,625 A | * | 8/1998  | Balogh   | 363/89 |
| 5,828,557 A |   | 10/1998 | Sugawara et al. | |
| 5,946,202 A | * | 8/1999  | Balogh   | 363/89 |
| 6,028,776 A |   | 2/2000  | Ji et al. | |
| 6,043,997 A | * | 3/2000  | He et al. | 363/44 |
| 6,049,472 A |   | 4/2000  | Suzuki et al. | |
| 6,115,274 A | * | 9/2000  | Mao      | 363/89 |
| 6,137,701 A | * | 10/2000 | Teissier et al. | 363/89 |
| 6,239,995 B1| * | 5/2001  | Weng et al. | 363/44 |

FOREIGN PATENT DOCUMENTS

WO    WO 01/69770 A1    9/2001

OTHER PUBLICATIONS

ML 4824, A Novel Method for an Off–Line PFC–PWM Combo Controller, Mar. 1998, Fairchild Semiconductor Corporation.

* cited by examiner

Primary Examiner—Jeffrey Sterrett
(74) Attorney, Agent, or Firm—Maine & Asmus (57) ABSTRACT

The invention in the simplest form is an improved AC inductor circuit design that is ideal for single boost, or split phase dual boost topologies, and other poly-phase systems improving input power factor and total harmonic distortion. The implementation is efficient, reliable, and flexible, utilizing a wide range of input voltages and currents (including synthesized input voltage waveforms other than sinusoids), and variable frequency voltage sources such as flywheels or micro-turbines, switches, such as IGBT, MOSFET, in combination with AC inductors and typical high frequency rectifier diodes, high frequency rectifiers, or even some line frequency rectifier diodes. The present invention is applicable to power supplies, motor drives, power conditioners, power generation equipment, hybrid power conditioning and distribution equipment, appliances, and flywheels.

20 Claims, 13 Drawing Sheets

ENHANCED CONDUCTION ANGLE POWER FACTOR CORRECTION TOPOLOGY

CROSS REFERENCE TO RELATED APPLICATIONS

This application claims the benefit of U.S. Provisional Patent Application serial No. 60/280,253 filed on Mar. 30, 2001. The invention entitled SPLIT-FED AND BALANCED DUAL BOOST REGULATOR, application Ser. No. 09/732,114 filed Dec. 2, 2000 is a related application and is incorporated herein by reference for all purposes.

FIELD OF THE INVENTION

The present invention relates to an improved topology for single and multi-phase power factor correction and improved total harmonic distortion (THD).

BACKGROUND ART

Electric power distribution is a necessary element of systems that operate with electronic power or in the distribution of electronic power. Electronic devices are generally connected to some power source wherein the power arrives in one form and is transferred and transformed into a form more suitable for the operation of the equipment.

Power is more efficiently transferred in AC form with most utilities providing AC sources. For devices requiring DC input, rectification of the AC source to DC is required. AC-DC converters may also be used to "actively" rectify and boost the resulting DC output. Power converters, such as inverters, are necessary in modem power systems for converting AC or DC power to conditioned AC for feeding a power grid or for direct connection to loads. The AC input power may come from any of the energy generating devices such as photovoltaics, micro-turbines, fuel cells, superconducting storage, wave energy, etc. . . . Modern systems need to be able to interconnect a variety of sources and provide stable power.

An example of a common inverter device is a half bridge circuit configuration. An AC input source connects to a full-wave rectifier with a smoothing capacitor connected to a DC output. Across the smoothing capacitor, a series circuit of switching elements is connected while these switching elements are turned alternately ON and OFF at a high frequency by a pulse width modulator (PWM). Across one of the switching elements, a series resonance circuit of a resonating inductor and a resonating capacitor is connected through a DC component cutting capacitor, while a load is connected in parallel across the resonating capacitor.

A DC voltage is generated at the smoothing capacitor so that the switching elements are alternately turned ON and OFF, with a high frequency rectangular wave voltage V is applied through the DC component cutting capacitor to the load, and a high frequency voltage is supplied to the load due to a resonating action of the resonating inductor and capacitor.

The resulting switching has an inherent inefficiency. The switching elements can be power MOSFET or IGBT, with the switching controlled so that an inverter circuit current will be at a delayed phase with respect to the high frequency rectangular wave voltage V. The power factor of the inverter circuit current is, therefore not unity with respect to the high frequency rectangular wave voltage. A larger current than that to be supplied to the load causes a switching loss. There are further problems because an "actively" controlled switching element of a large current rating is required, and a high cost incurred.

Another example of a power source device is a full-wave rectifier that connects to an AC input source with one of the switching elements connected through an inductor to the DC output of the full-wave rectifier. A smoothing capacitor is connected through a diode across the switching element. An input current in accordance with the input voltage from the AC power source is supplied. In this case, a voltage boosting chopper circuit is established by means of the inductor, one switching element, diode and smoothing capacitor, while the one switching element is also employed as a switching element of the inverter circuit.

To the smoothing capacitor, a series circuit of a pair of switching elements is connected, and a diode is connected in inverse parallel across each of these switching elements. Across one of these switching elements, an inverter load circuit is connected through a DC component cutting capacitor, and the inverter load circuit includes a series resonance circuit of another resonating inductor and a resonating capacitor, while a load is connected in parallel across the resonating capacitor. The respective switching elements are caused to be alternately turned ON and OFF by a DC voltage from the smoothing capacitor, and a rectangular wave voltage is supplied to the inverter load circuit, whereby a high frequency is caused to flow to the resonating inductor. The switching element also acts as a chopper circuit, so that an input current will be caused to flow through one of the inductors, the input current distortion is improved, and the smoothing capacitor is charged by an energy accumulated in the inductor.

It should be understood that a current from the resonating inductor and a current from the other inductor are made to flow to the switching element as superposed on each other so as to be a large current. This results in a power loss or inefficiency as the switching element has to be larger in size to handle larger loads.

Another example is a capacitor that is connected in series with an inductor, whereby the charging energy to the smoothing capacitor is weakened, and the voltage of the smoothing capacitor is restrained. The chopper operation turns 'ON' the switching elements which causes an input current to flow from the AC power source through the full-wave rectifier, another capacitor, the inductor, a switching element and full-wave rectifier, and an energy is accumulated in these another capacitor and one inductor.

As the switching element turns 'OFF', a current flows through the inductor, the diode, smoothing capacitor, full-wave rectifier, another capacitor and inductor, and the smoothing capacitor and capacitor are charged by a voltage induced at the inductor. Further, when the other switching element is turned 'ON', a current flows through another capacitor, another diode, another switching element, an inductor and another capacitor so that the other capacitor will be a power source, and a current in a reverse direction to that in the previous period is caused to flow to the one inductor.

Pulse Width Modulated (PWM) power inverters are generally available in three-phase bridge, H-bridge, and half bridge configurations. The rectifier fed, electrolytic bus capacitor banks often consist of two or more capacitors connected in series to expand the maximum bus voltage capacity. For distributed power applications a neutral is typically connected to the center of the DC bus, between the two series caps. The capacitor charge path of the PWM inverter is through the series capacitors simultaneously, tending to keep the total bus voltage (upper and lower bus voltages) constant.

However, a diode rectifier circuit such as is typically used by a switching power supply requires a large input current value relative to the power consumption as represented by an input power factor of about 0.6 to 0.67. Thus, the reactive power in supplying and distributing power systems is generally inefficient, as well as very high THD.

Figure 1:
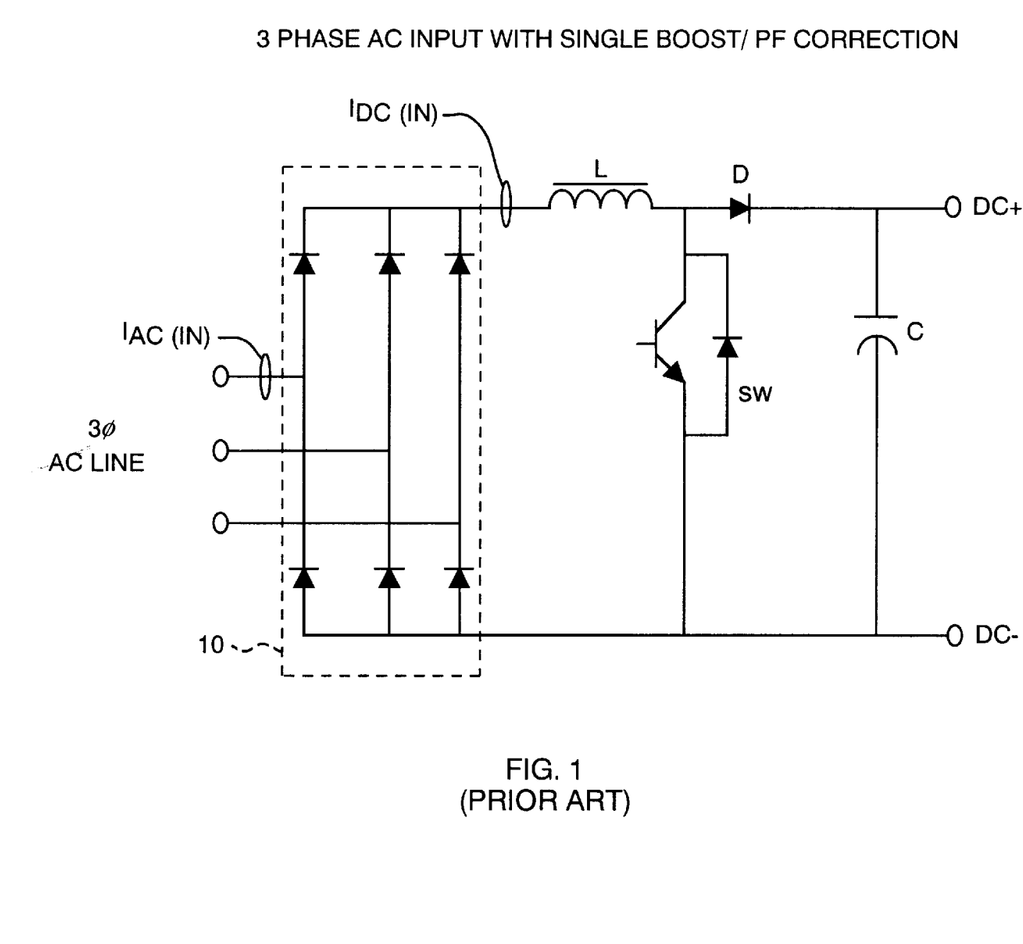

There have been numerous attempts to alleviate the problems and inefficiencies noted in the prior art devices. FIG. 1 shows a basic schematic of a three phase AC input with a single boost. The inductor L is connected in series after the rectifier section 10 so that it operates on the rectified three phase AC signal. When the gating switch SW is turned 'ON', the current builds up in L. When the switch SW is turned 'OFF', the inductor charge L is discharged into the capacitor C and forms the output DC signal. Typically the switch SW is pulse width modulated to control the energy transfer.

Figure 2:
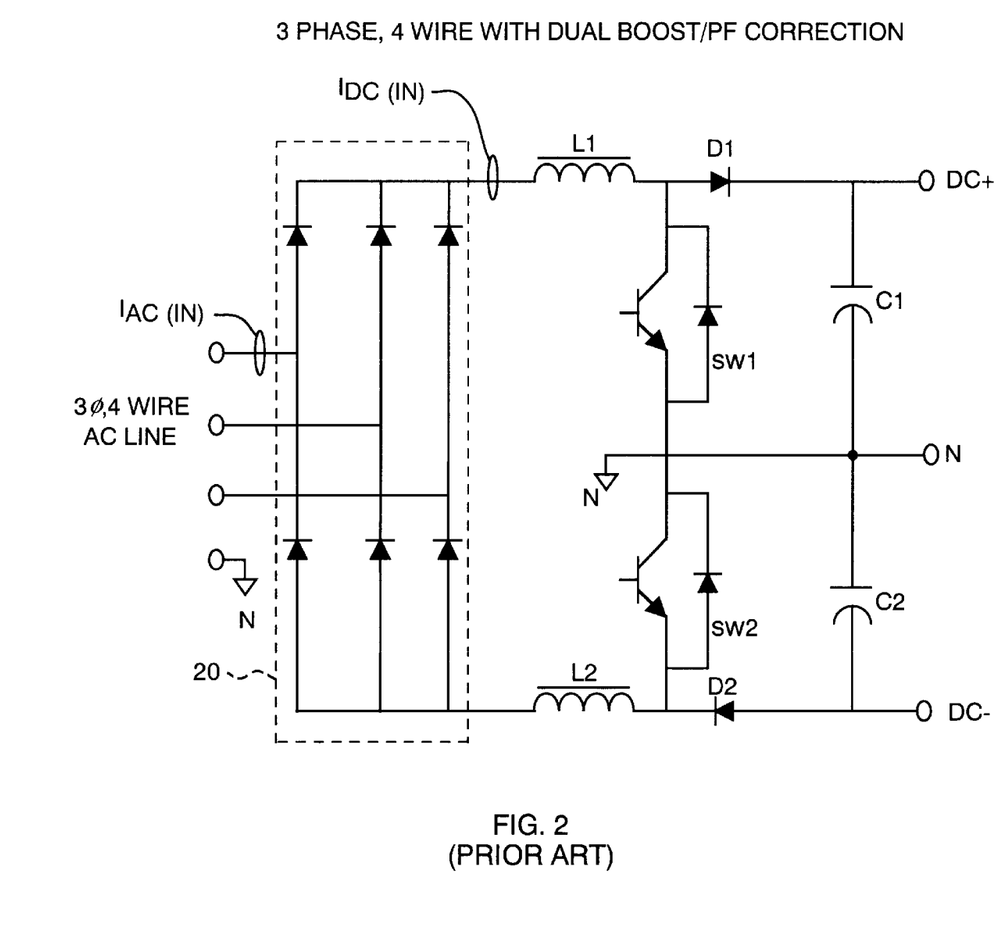

FIG. 2 illustrates a basic schematic of a three phase four wire scheme with dual boost. Once again, the inductors L1 and L2 are connected after the rectifier section 20. The switches SW1 and SW2 control the current flow and charging of the inductors L1 and L2 that are discharged into C1 and C2 respectively with the DC output level formed from the output capacitors C1 and C2.

Figure 3:
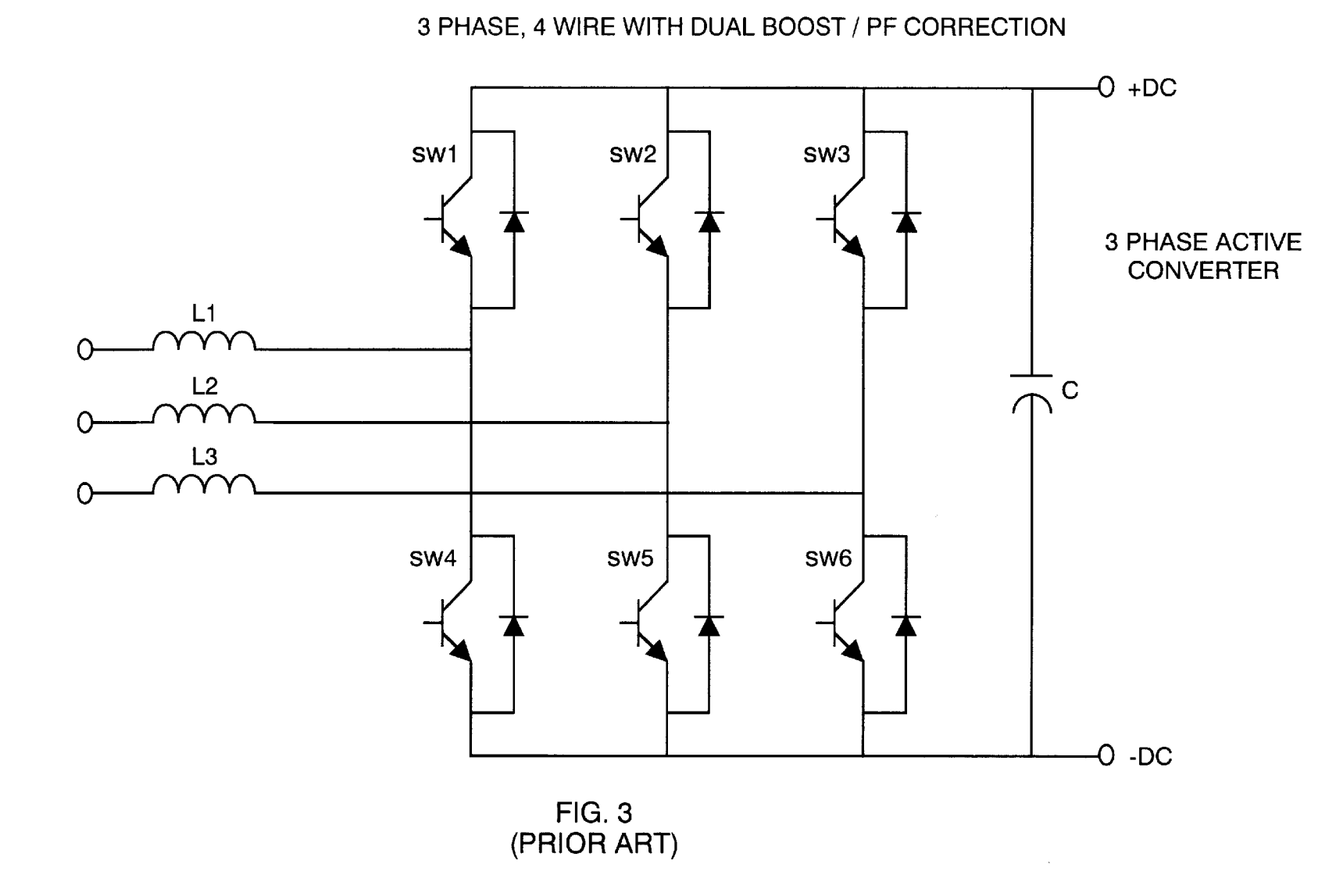
FIG. 3 3 phase active converter (prior art)

The basic schematic of FIG. 3 illustrates a three phase active converter. In this circuit, the AC inductors L1–L3 are each connected to the switches SW1–SW6, wherein a complicated switching control operates to "actively" rectify and boost the resulting DC voltage that is stored in the output capacitor C. The three-phase bridge, active converters (typically 4 quadrant) are used in a variety of applications, including regenerative motor drives to accomplish PF correction. However, these topologies carry a high cost using six fully rated IGBT switches that operate at a relatively low efficiency. Further, these AC-DC power converters require complex control techniques and lack reliability.

A three phase rectifier circuit is also described in patent application PCT WO 01/69770. This invention describes a three phase rectifier with a low frequency filter that includes two AC reactors. This topology does not include boost switches and the filter capacitors are 'after' the three phase reactor.

The circuit of U.S. Pat. No. 6,049,472 is a single phase circuit application for a power factor improving circuit operating without a boost switch. The primary focus of the 'this patent is the second stage of the circuit.

U.S. Pat. No. 6,028,776 ('776) discloses a power factor correction circuit having a double stage layout with a bridge diode, booster, a switch section, a control section, a delay section, and an output section. The '776 invention is a single phase implementation that does not account for the difficulties in multi-phase operations, and uses DC inductors.

What is needed is a power factor correction scheme that eliminates the problems of the prior art devices. There is a current need for a robust, simple and low cost single or poly-phase power factor correction topology in the energy storage/power fields. Such a system should allow ease of installation into existing systems and replace only a front end section. Any such improved power factor correction scheme should also reduce complexity, cost, and space requirements in addition to improved efficiency.

SUMMARY OF THE INVENTION

The present invention has been made in consideration of the aforementioned background. An improved, low cost, high-efficiency method for improving single or poly-phase input power factor and total harmonic distortion. The performance is superior to prior art DC inductor based PF correction circuits.

The present invention provides an efficient and reliable method for improving three phase input power factor and THD applicable to power supplies, motor drives, power conditioners, power generation equipment, hybrid power conditioning and distribution equipment, appliances, and flywheels.

An object of the present invention is an improved circuit design ideal for single boost, split phase dual boost topologies, and other poly-phase systems. The implementation is also flexible, utilizing a wide range of input voltages and currents (including synthesized input voltage waveforms other than sinusoids), and variable frequency voltage sources such as flywheels, switches, such as IGBT, MOSFET, in combination with AC inductors and typical high frequency rectifier diodes, high frequency rectifiers, or even some line frequency rectifier diodes.

In one embodiment the present invention comprises a three-phase six pulse diode rectifier and a boost switch(es) with a three-phase reactor or three AC line inductors to provide DC volts regulation and input PF correction and THD reduction.

While there are three-phase power active converters (4 quadrant usually) used in regenerative motor drives that accomplish PF correction—they do so at a very high cost and require six switches (usually IGBT's) and with low efficiency.

An object of the invention is an AC voltage to DC voltage converter with improved power factor, the converter comprising a single phase AC input with a pair of inductors each coupled in series to the AC input on a first end of the inductors. There is a rectifier section coupled to the inductors on a second end of the inductors, wherein the rectifier section converts the AC voltage to the DC voltage. A switch is coupled in parallel to the rectifier section for modulating stored charge from the inductors to an output capacitor, with a diode connected in series to the output capacitor.

A further object is the AC voltage to DC voltage converter wherein the switch is coupled to a pulse width modulating controller. In addition, wherein the pulse width modulating controller uses a DC output volts feedback to provide boost synchronization of the AC input.

Yet another object is the AC voltage to DC voltage converter, wherein the pulse width modulating controller controls the switch to maintain the AC input within an upper tolerance band and a lower tolerance band. In addition, wherein a switching frequency from the pulse width modulating controller varies as a function of the input volts with a minimum di/dt and maximum switching frequency occurring at a zero crossing.

An additional object is the AC voltage to DC voltage converter, further comprising a processing section, wherein the processing section calculates a switching frequency correction factor using a preset and calculated tolerance band that tracks the input volts and based on the L–N voltage at the zero crossing.

An object of the invention is a circuit for converting an AC voltage into a DC voltage, the circuit comprising a three phase AC input, three AC inductors having a first end and a second end, wherein the inductors are coupled in series on the first end to the AC input. A rectifier section coupled to the inductors on the second end, wherein the rectifier section converts the AC voltage to the DC voltage. There is a switch transferring stored charge from the inductors to an output capacitor through a series connected diode, with a pulse width modulator section controlling the switch.

A further object is the AC voltage to DC voltage converter, further comprising a switching ripple filter section coupled to the three phase AC input.

And an additional object is a circuit for converting an AC voltage into a DC voltage, the circuit comprising a three phase AC input with three AC inductors having a first end and a second end, wherein the inductors are coupled in series on the first end to the AC input. A rectifier section coupled to the inductors on the second end, wherein the rectifier section converts the AC voltage to the DC voltage. There is at least one switch transferring stored charge from the inductors to at least one output capacitor through a series connected diode, and a pulse width modulator section controlling the switch.

Other objects, features and advantages are apparent from description in conjunction with the accompanying drawings.

BRIEF DESCRIPTION OF THE FIGURES

The present invention will be readily understood by the following detailed description in conjunction with the accompanying drawings, wherein like reference numerals designate like structural elements, and in which:

FIG. 1 3 phase AC input with single boost PF correction (prior art)

FIG. 2 3 phase 4 wire with dual boost PF correction (prior art)

FIG. 4e waveform showing the maximum condition duration of $\frac{2}{3}\pi$ for a typical DC inductor after the rectifier section for the phase current FIG. 5 topology design with the AC inductors operating prior to the rectification section for the three phase AC input with single boost PF correction FIG. 6a simplified schematic of a single phase example with the inductor before the rectifier stage and the charge gated to the output capacitor by the switch FIG. 6b output waveform of a single phase example of FIG. 6a comparing the ideal current 160 with the actual current 170 to illustrate the cusp distortion FIG. 7a illustration of the tolerance band control for the boost switch of the PWM switching management scheme FIG. 7b graphical depiction of the change in current over the change in time for FIG. 7a FIG. 7c switching frequency of the PWM control for FIG. 7a FIG. 8 dual boost configuration with AC inductors prior to the rectification stage FIG. 9 250 KVA flywheel topology showing ECA PF correction FIG. 10 Control diagram of a fixed frequency PWM in a 3 phase 3 wire application

DESCRIPTION OF THE PREFERRED EMBODIMENT

The foregoing description of the preferred embodiment of the invention has been presented for the purpose of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

Referring to FIGS. 1–3, these figures show the topologies of prior art PF correction circuits. FIGS. 1 and 2 of these prior art designs show the rectifier section located on the line side "in front" of the boost inductor, so the boost inductor is a DC component. While the boost switch can force the DC current to approach unity PF, the circuit is limited in that distribution of current flow in the three AC lines cannot be precisely controlled. The active controller of FIG. 3 is a complex circuit requiring at least six switches that adds to cost, complexity and space problems.

Figure 4A:
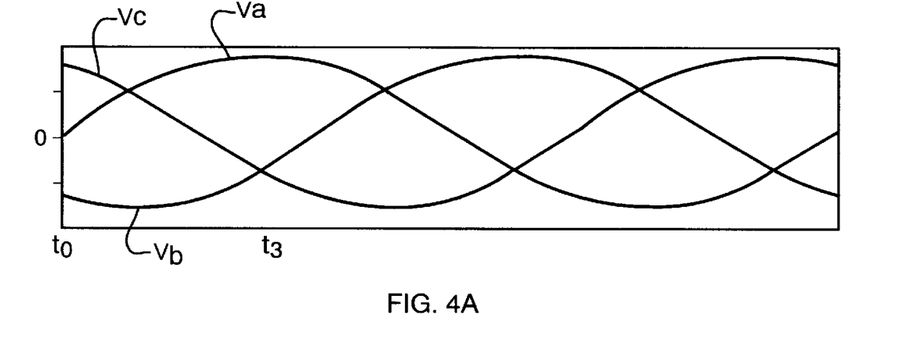
FIG. 4a AC voltage waveforms A, B and C showing zero crossing and relationship
Figure 4B:
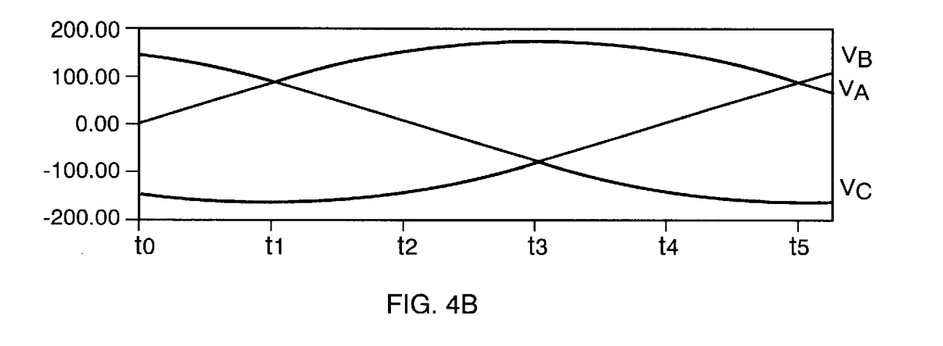
FIG. 4b AC voltage waveforms $V_A$, $V_B$, $V_C$ showing the timing for times t1–t5 with ideal PF FIG. 4c AC current waveform showing the ideal phase A conduction duration for time t0–t5

Referring to FIG. 4a, AC current distribution (among the 3 phases) is determined by instantaneous voltage of the input power. This is true for either 3 wire or 4 wire (3 phase and neutral) rectifier/power configurations. Using the AC inductors prior to rectification improves efficiency and a simple example of a dual boost of FIG. 2 clearly illustrates the improvement. When equipped with the standard upper and lower DC inductors L1, L2, it is not possible to force conduction through the input rectifiers immediately after the $V_{1-n}$ zero crossing. Some delay before the input current conduction is inevitable thus limiting the maximum PF and efficiency. Employing the dual boost with only AC inductors on the input line, the dual boost circuit is able to force conduction through the input rectifiers approximately immediately after the $V_{1-n}$ zero crossing thus improving efficiency. This concept is illustrated in more detail herein.

Referring to FIGS. 4a–4e, the AC waveforms $V_A$, $V_B$, and $V_C$ are illustrated showing the three phase relationship to each other and to the zero crossing. As $V_A$ crosses zero at t0 and rises to its positive peak at t3, the ideal PF correction current 50 would immediately begin to flow from $V_A$ to $V_B$.

Referring to FIG. 4a, as $V_A$ crosses zero and rises to its positive peak, the ideal PF corrected current would begin to flow from $V_A$ to $V_B$, immediately after the zero crossing. However, in actuality this does not occur because $V_C$ is higher in voltage than $V_A$ at this moment. Therefore, the actual current flow is from $V_C$ to $V_B$ from t0 to t1 as reflected in FIG. 4d. The actual $V_A$ current 60 starts at t1 and proceeds through t5 where it is cut short because at this point because $V_B$ is then higher in voltage than $V_A$ and the current flow for $V_A$ stops.

Although the PF correction can force the 'DC input current' to increase immediately following the zero crossing of $V_A$, the current path will continue to be from $V_C$ to $V_B$ The following timing (t) shows the current paths:
$t_0$–Start of "ideal" current ($V_A$ to $V_C$)
$t_1=[\frac{1}{6}\pi]$ Actual start of current ($V_A$ to $V_B$)
$t_2=[\frac{1}{3}\pi]$ Start of "ideal current ($V_A$ to $V_C$)
$t_3=[\pi/2]$ Actual start of current ($V_A$ to $V_C$)
$t_4=[\frac{2}{3}\pi]$ Stop of "ideal" current ($V_A$ to $V_B$)
$t_5=[\frac{5}{6}\pi]$ Actual stop of current ($V_A$ to $V_C$) (etc)

Figure 4C:
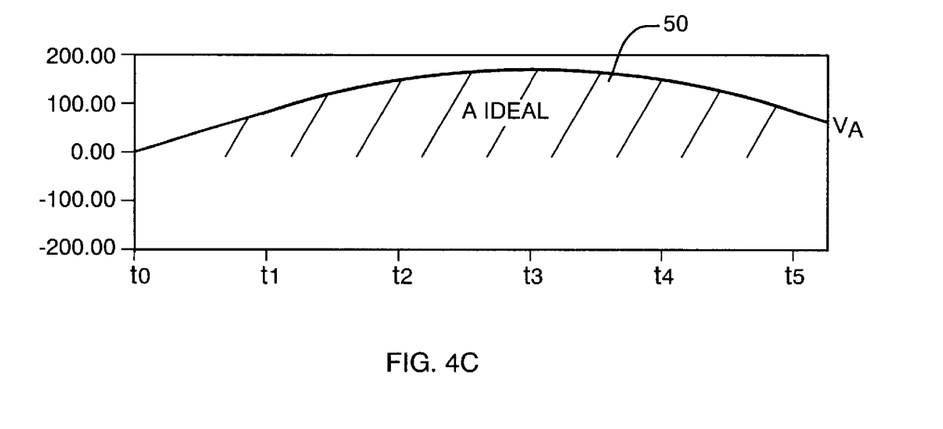
Figure 4D:
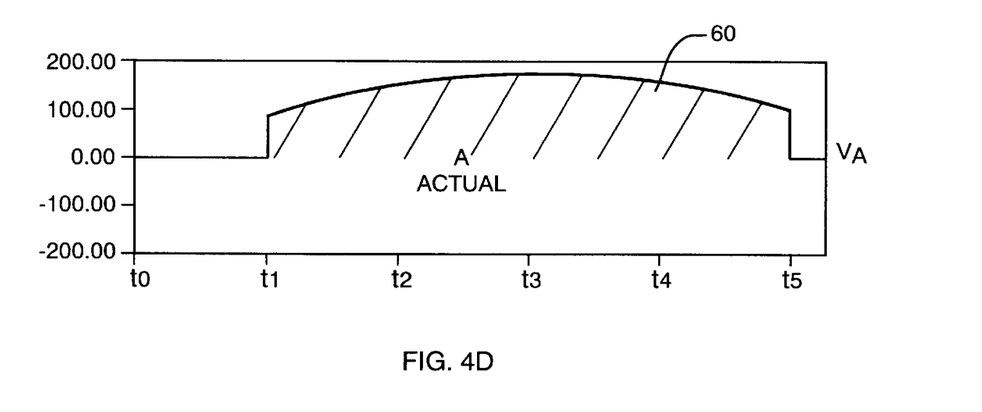
FIG. 4d AC current waveform showing the actual phase A conduction duration for time t0–t5
Figure 4E:
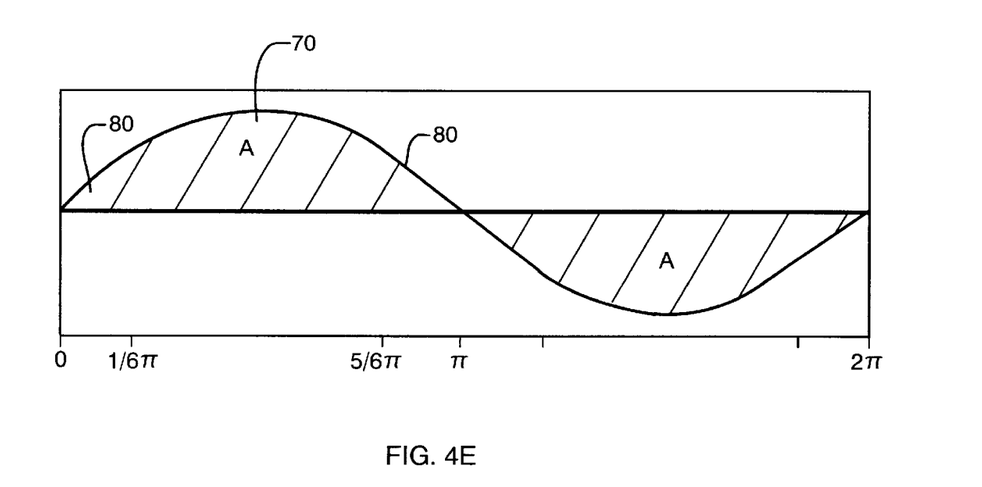

As shown in FIG. 4e, when incorporating the DC inductor after the rectifier, the maximum condition duration of each phase current is $\frac{2}{3}\pi$ as shown as A actual region 70 within the sinusoid $V_A$ wave bounded by $\frac{1}{6}\pi$ and $\frac{5}{6}\pi$. The regions from 0 to $\frac{1}{6}\pi$ and $\frac{5}{6}\pi$ to $\pi$ (80) are not part of the actual voltage signal.

Figure 5:
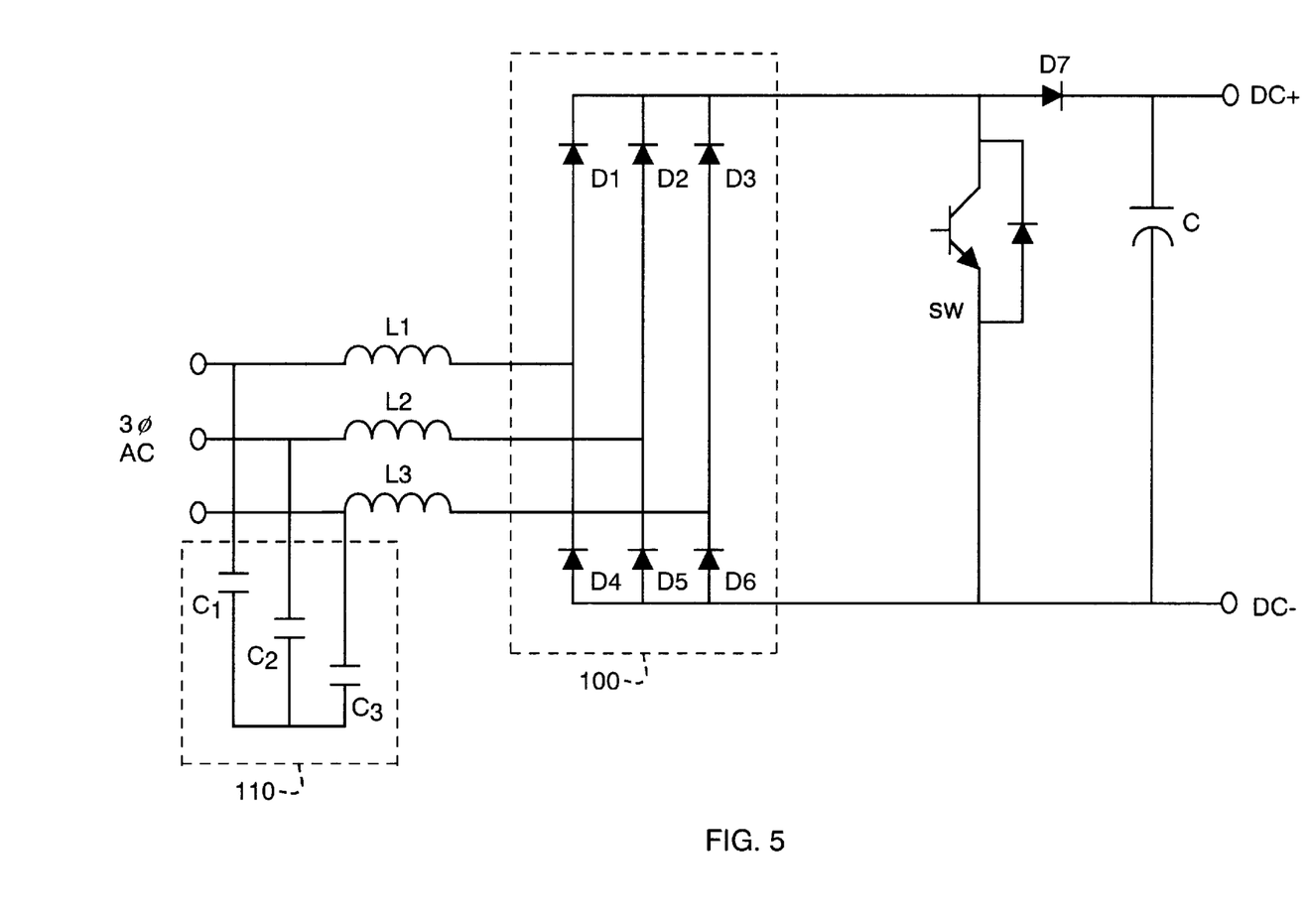

By placing the boost impedance before the rectifier 100, as shown in FIG. 5, it is possible to extend the maximum conduction angle from $\frac{2}{3}\pi$ to nearly continuous $\pi$. This is primarily because the individual inductors L1–L3 allow the boost switch SW to switch against each phase individually. The three inductors L1–L3 act to drop the applied line voltage phases independently, but simultaneously. This allows a much lower THD and PF of the input power. Thus more closely matching the ideal situation of FIG. 4c, which demonstrates the enhanced conduction angle.

A variation of the circuit includes a section for switching ripple frequency 110. In this particular embodiment capacitors C1–C3 on the input lines are used for boost switching frequency ripple filtering. Other switching ripple circuits 110 are within the scope of the invention.

A further benefit of the present topology is that the feed forward term (control input) normally used to synchronize the boost switch to the input AC waveform is no longer required as boost synchronization to the input AC volts waveform occurs automatically. By simply providing the boost PWM controller (not shown) with the DC output volts feedback the varying the voltage across the AC input inductors, $V_{L1}$, $V_{L2}$, $V_{L3}$ will automatically produce a synchronized quasi-sinusoidal current, thus simplifying the PWM controller and processing (not shown). This invention works equally well with the dual boost (3 phase, 4 wire) type AC to DC converter, or a single boost (3 phase, 3 wire), or even single phase wire systems.

A further description of the feed forward term and PWM control is found in the pending application entitled SPLIT-FED AND BALANCED DUAL BOOST REGULATOR, application Ser. No. 09/732,114, filed Dec. 2, 2000.

Figure 6A:
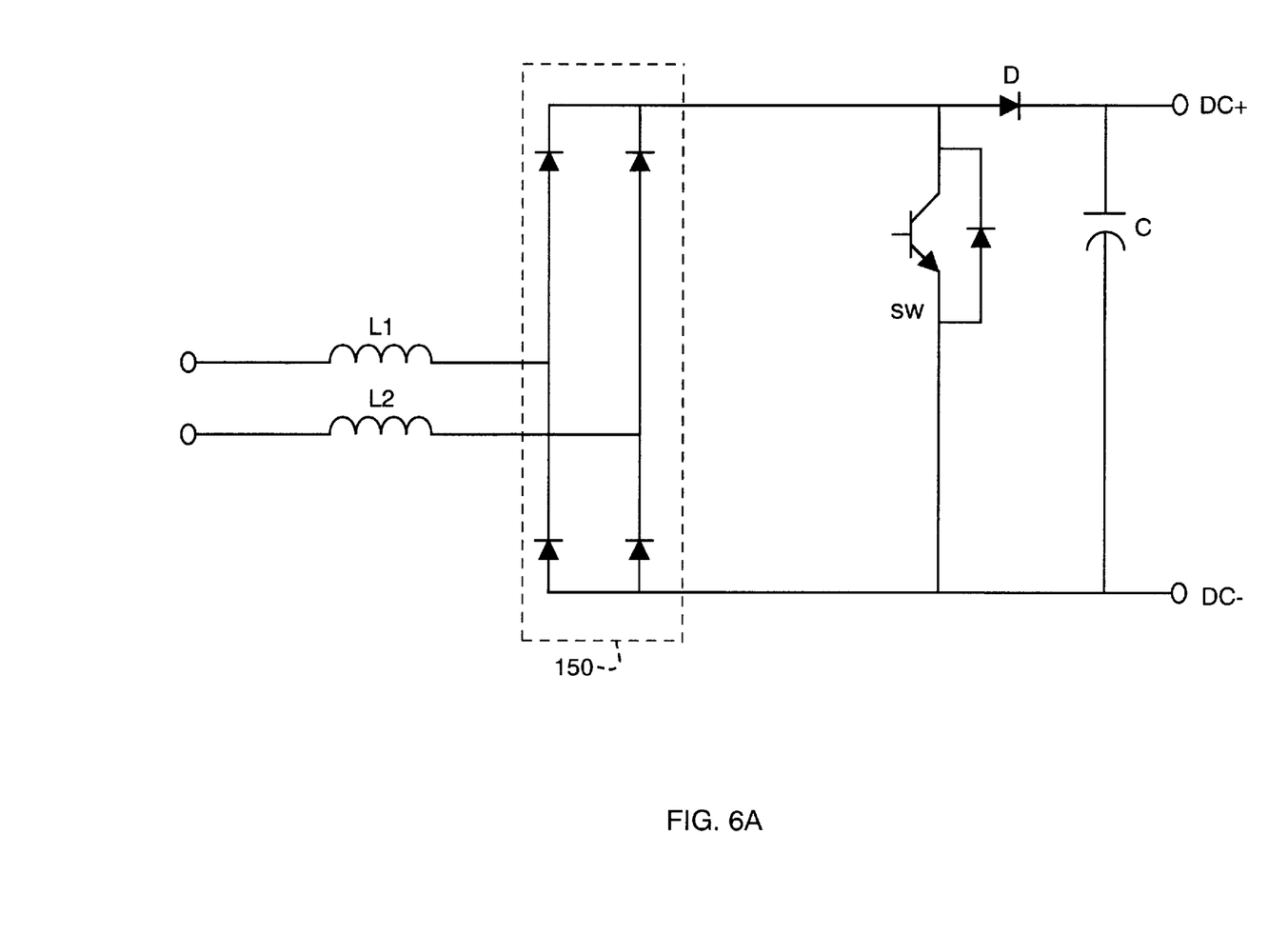
Figure 6B:
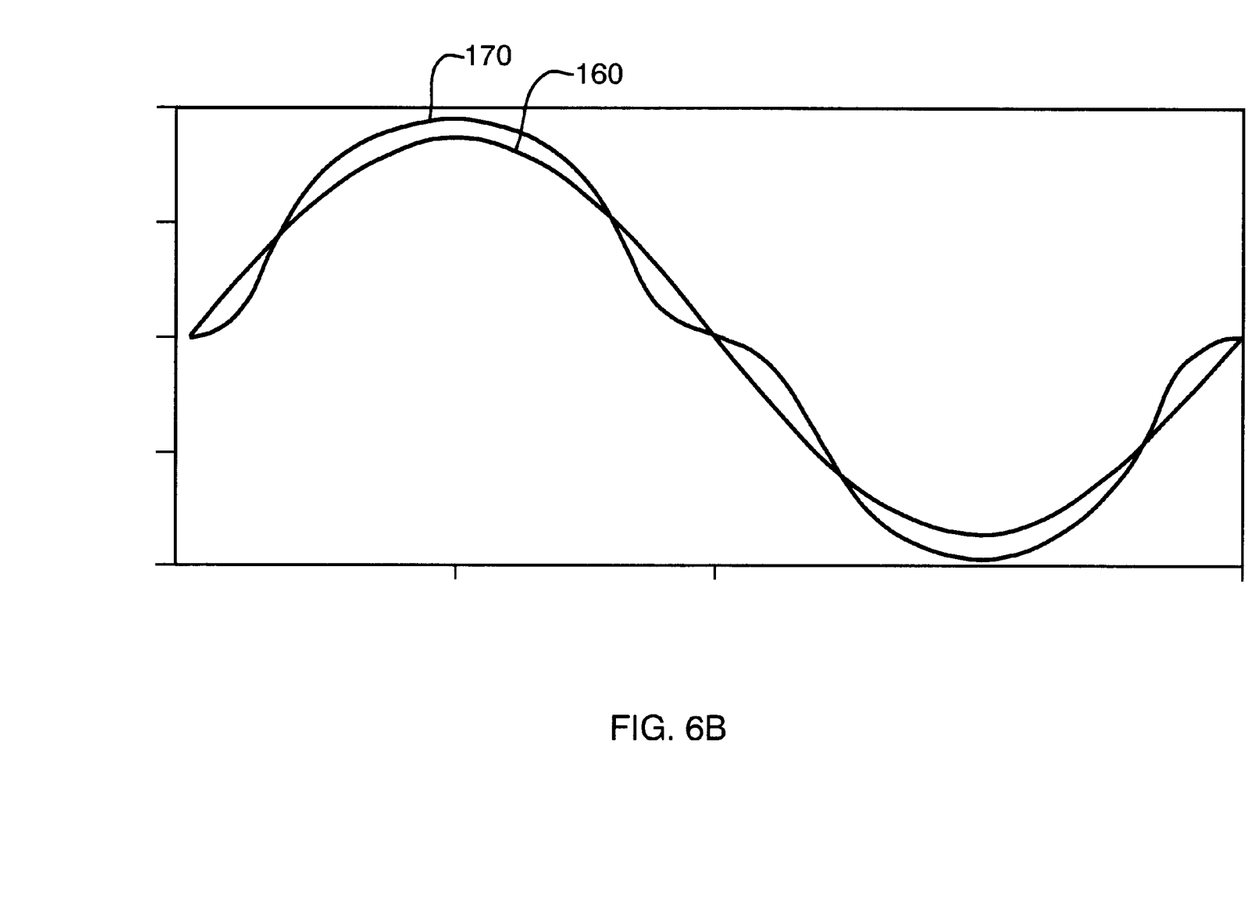

One method for minimizing the cusp distortion in the boost/PF correction topology is graphically illustrated in FIGS. 6a, 6b. In this single phase example, the current $I_{DCin}$ is gated from the inductors L1, L2 to the output capacitor C by the switch SW with the rectification occurring in the rectifier section 150. The cusp distortion occurs during the AC $V_{1-n}$ zero crossing where the desired current 160 is not matched by the actual current 170. This is because the change in voltage across the DC inductor, $V_L$, is very small, thereby limiting the maximum slew rate of the input current. In practice, a compromise between output current ripple and input cusp distortion is made. Thus, a smaller inductance value decreases the cusp distortion, but increases output ripple. And, vice versa, wherein a larger inductance value decreases the output ripple but increases the cusp distortion.

To improve on the this approach, a variable switching frequency PWM pattern was used where the PWM frequency is reduced during the cusp's current slew rate allowing the maximum di/dt (current slew rate) possible during the cusp's. And, the PWM frequency is increased during the peaks of sinusoidal input voltage to reduce output ripple. This is similar to a "tolerance band" PWM control scheme commonly used on DC to AC PWM inverters. Overall, reduced cusp distortion with acceptable output current ripple can be achieved by careful selection of AC input inductor impedance values with either a fixed frequency, or a variable frequency PWM controller.

The embodiment for cusp distortion that incorporates a variable switching frequency control is shown wherein for this technique a line voltage feedback/synchronous signal is provided to the PF/boost PWM modulator for generation of an AC current reference signal, and for correct switching frequency variance (synchronization).

There are a few variations of PWM switching frequency management for the present invention where the cusp distortion is minimized and the output current ripple is also kept to a minimum. One of the methods is shown in FIGS. 7a–7c, and is particularly well-suited for single phase input power application of FIG. 6a, but also easily adapted to three phase input power as well.

Figure 7A:
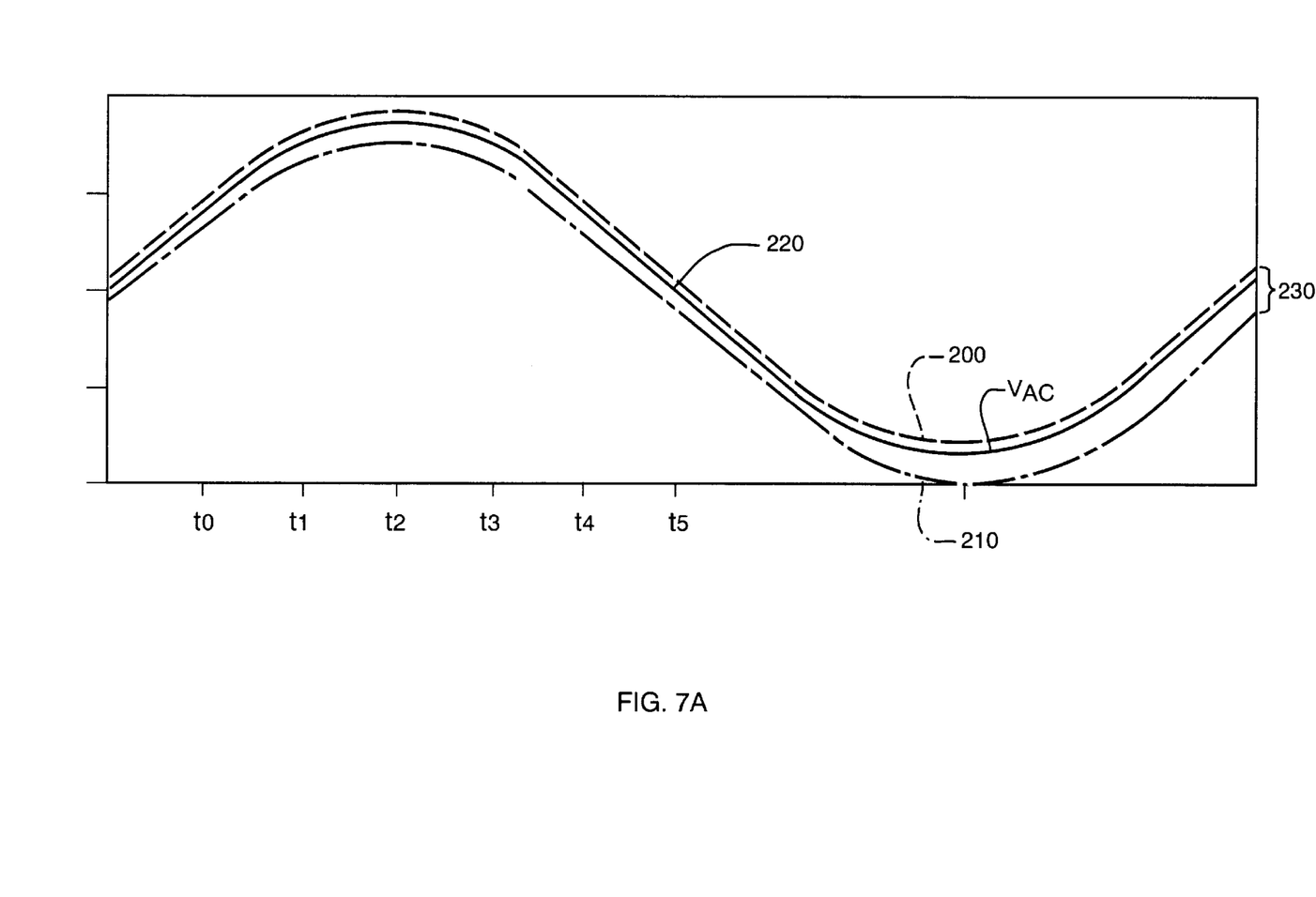

Referring to FIG. 7a, the PWM management scheme allows the boost switch SW to turn on and stay on until the VAC crosses the upper tolerance band 200. Conversely, once the switch SW is turned 'OFF', it remains off until VAC crosses the lower tolerance band 210. The tolerance band 230 is the upper and lower limits about the VAC signal. This is similar to a "tolerance band" PWM control scheme commonly used on DC to AC PWM inverters.

Figure 7B:
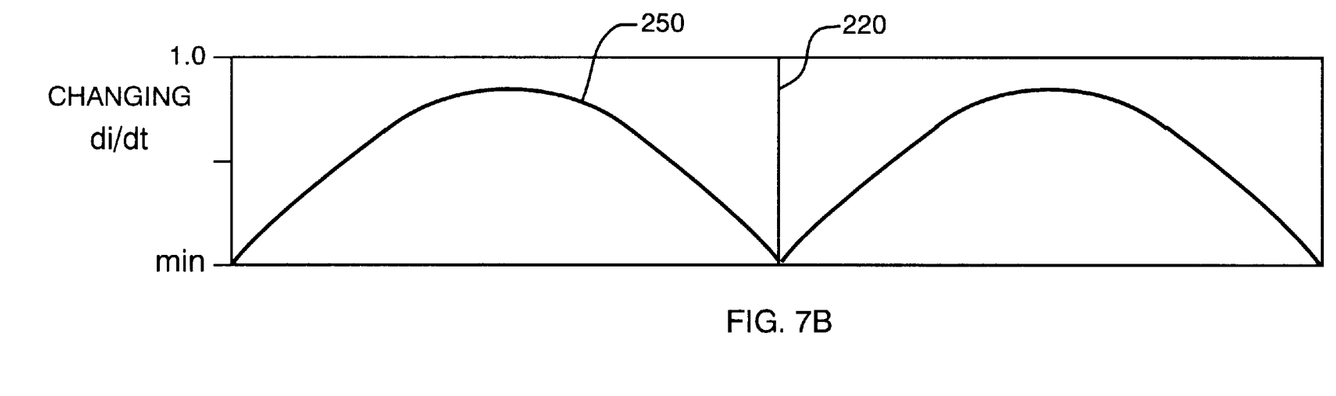

Referring to FIGS. 7a, 7b, as the di/dt varies as a function of the input volts (volts across the AC inductor), the switching frequency will therefore also be varied by the controller as a function of the input volts. It is possible to force the output current ripple to remain nearly constant throughout the cycle utilizing this methodology.

Figure 7C:
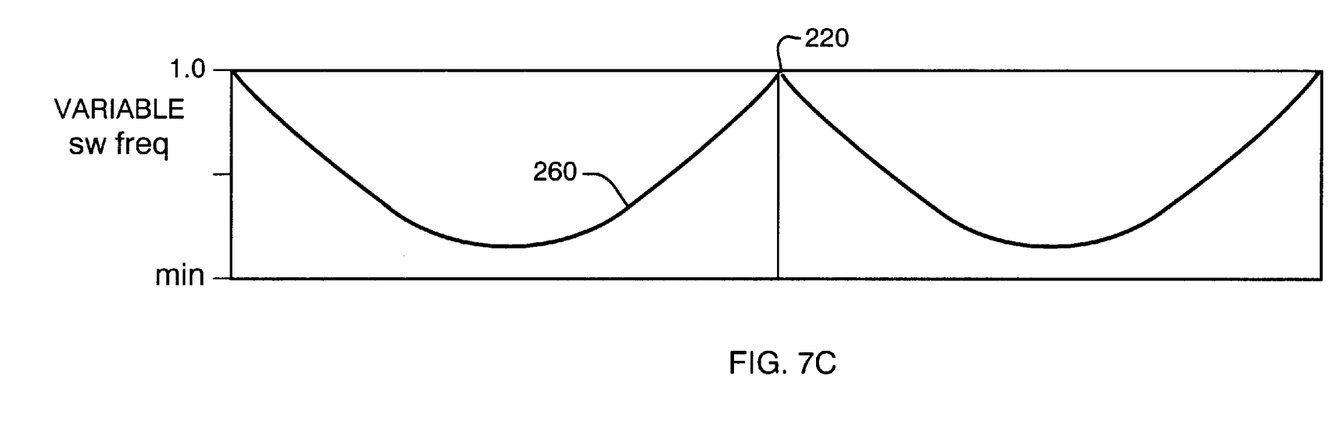

Referring to FIGS. 7b and 7c, as the di/dt 250 varies as a function of the input volts, (volts across the AC inductor), the switching frequency 260 will therefore also be varied by the controller as a function of the input volts with the minimum di/dt and maximum switching frequency occurring at the zero crossing 220. It is possible to force the output current ripple to remain nearly constant throughout the cycle utilizing this methodology.

Another PWM management scheme uses preset calculated tolerance bands to control the functionality. The control tracks the input volts and based on the L–N voltage at the zero crossing calculates the appropriate switching frequency correction factor. This scheme is similar to the tolerance band scheme, but is easier to implement and can therefore use a microcontroller, microprocessor or digital signal processor implemented within the circuit.

Figure 8:
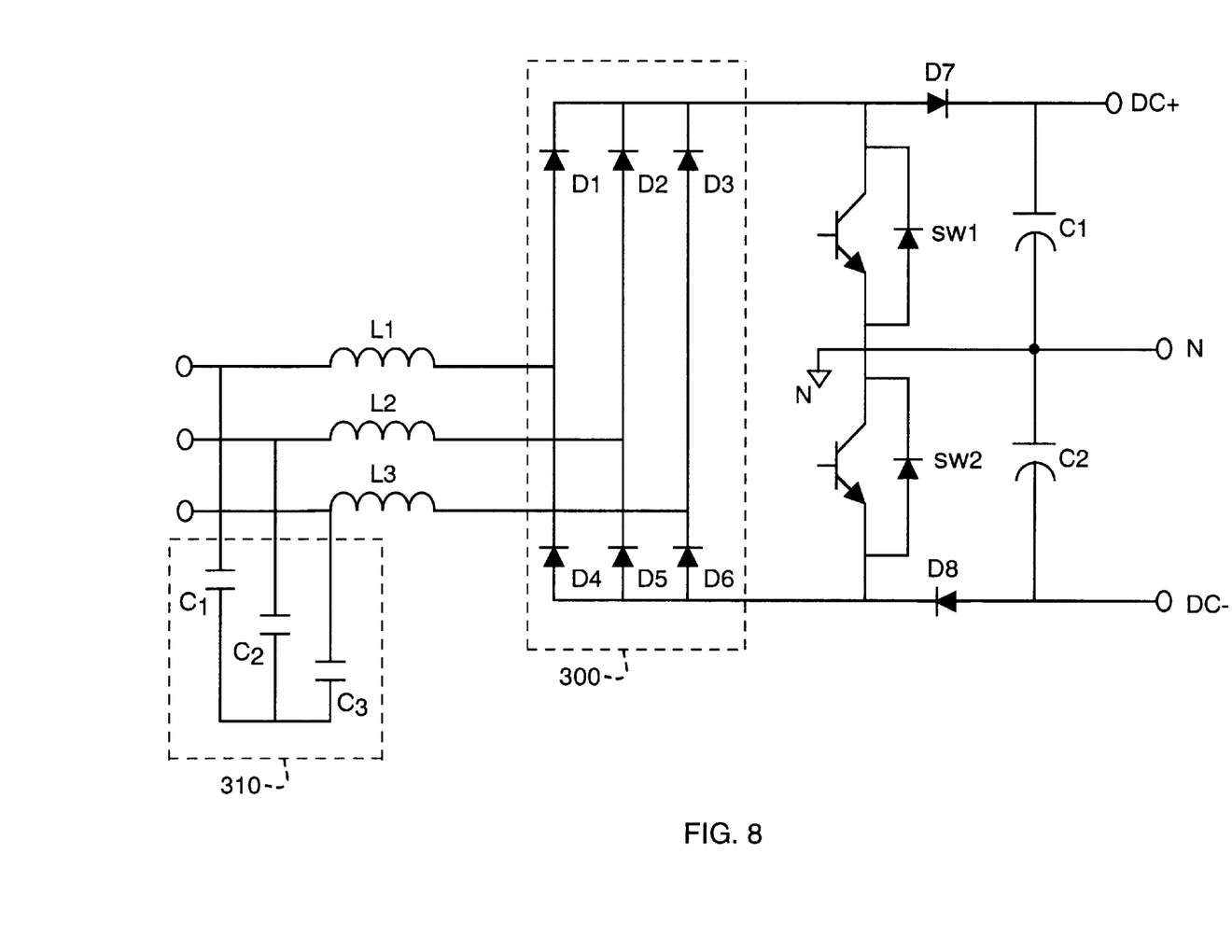

Referring to FIG. 8, the prior art dual boost three phase circuit of FIG. 2 is shown incorporating the inductors L1, L2, L3 prior to the diode rectification stage 300. In this embodiment, the dual boost uses the three AC line inductors L1, L2, and L3 to replace the DC link inductors shown in FIG. 2. FIG. 4c illustrates an AC current waveform showing the ideal phase A conduction duration for time t0–t5. This scheme improves the input PF as compared to the standard design with the upper and lower DC link inductors. The values of the AC line inductors in one design were 150 uH, as an example. The AC inductors on the power lines allows the dual boost circuit to force conduction through the input rectifiers D1–D6 almost immediately after the $V_{1-n}$ zero crossing thereby improving the input PF. The switching ripple filter section 310 aids in cleaning the signals.

The ECA PF correction topology of FIG. 8 is a 3 phase 4 wire AC input and a dual boost that shows two output capacitors C1, C2 with a common neutral. This topology is used in three phase power conditioners where an additional neutral phase output is required. In this scheme, the upper and lower boost switches SW1 and SW2, operate independently to regulate the output capacitors C1 and C2. The resulting capacitor voltages across C1 and C2 remain balanced thereby ensuring a high quality neutral phase.

Figure 9:
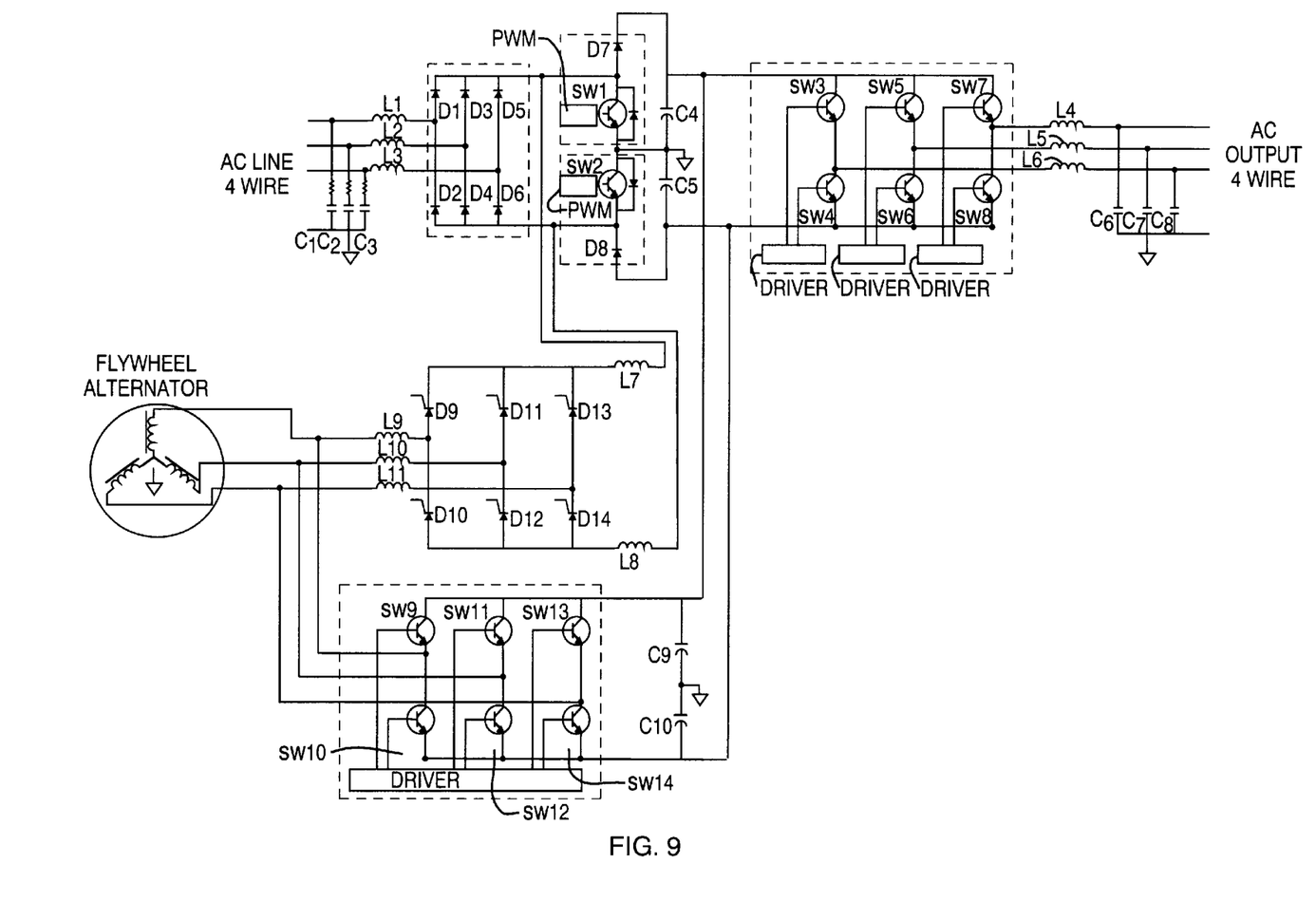

FIG. 9 is one embodiment of the present invention shown in a three phase four wire 250 kVA flywheel uninterruptible power supply (UPS) power application. This ECA topology utilizes a fixed frequency dual boost PWM controller (not shown), independent AC inductors L1–L3, switching ripple filters C1–C3, a high frequency rectifier D1–D6, and the dual boost power switches SW1, SW2, D7, D8, and center tapped output storage capacitors C4, C5, for 3 phase 4 wire applications.

The AC output inverter is fed energy from storage capacitors C4, C5 and consists of a three phase bridge SW3–SW8, a PWM filter consisting of three independent AC inductors L4–L6, and C6–C8. The flywheel is charged by a small PWM inverter consisting of SW9–SW14, and local storage capacitors C9, C10. The flywheel is discharged by SCR rectifiers D9–D14, via DC inductors L7, L8 through the dual boost power switches SW1, SW2, D7, D8 with resulting regulated DC volts output stored in C4, C5. During discharge the SCR's are protected from excessive dv/dt by inductors L7–L11 and a standard SCR RC type snubber (not shown). Further, the flywheel charging inverter is disabled during flywheel discharge. In some cases, the SCR's can be substituted by typical high frequency diodes.

Figure 10:
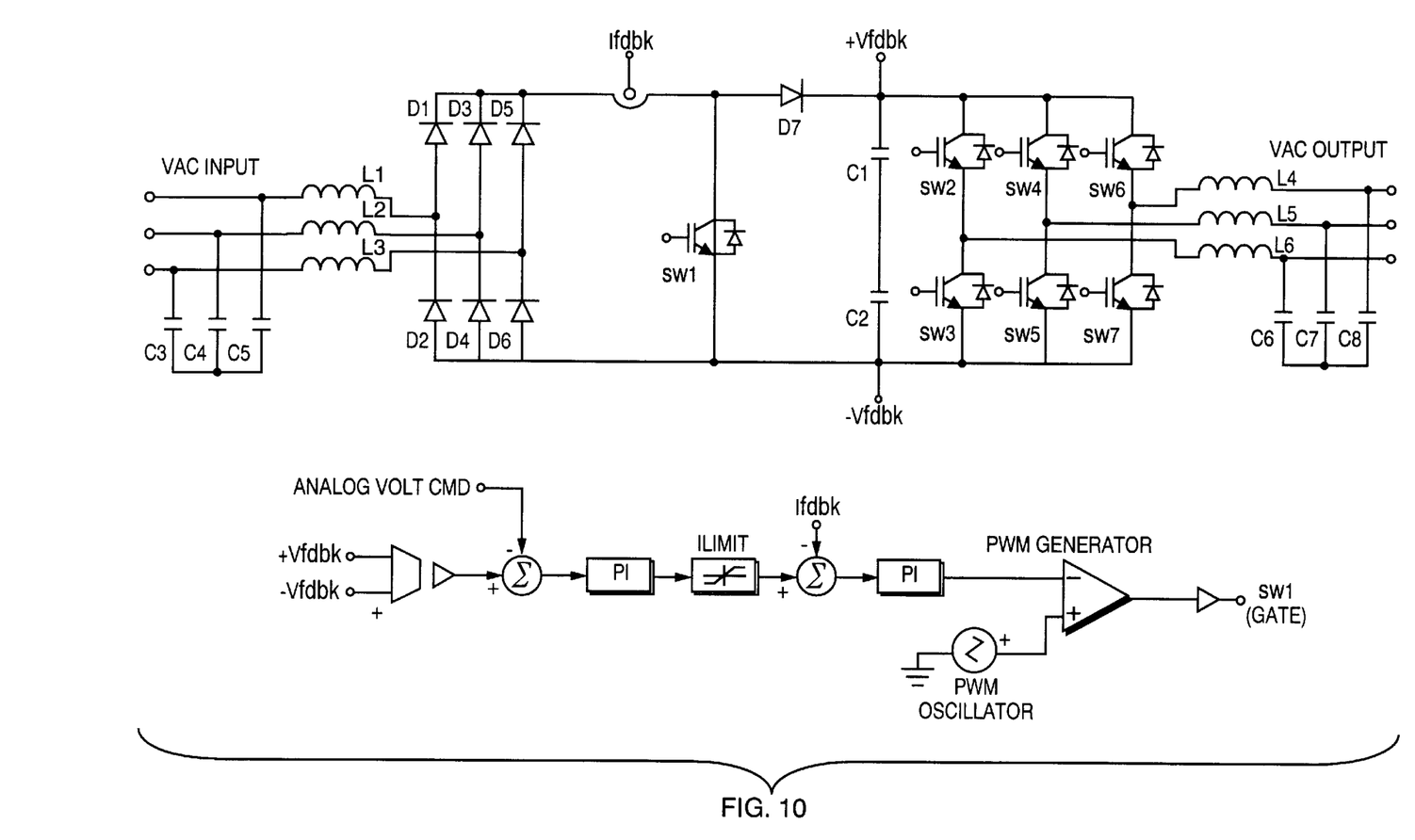

FIG. 10 is one embodiment of a three phase three wire, power conditioner topology with a single boost stage and a fixed frequency PWM control. AC power is applied to AC PF correction/boost inductors L1–L3, and the switching ripple filters C3–C5. Rectifiers D1–D6 pass DC current, via the current sensor Ifdbk, through the boost diode D7 to charge storage capacitors C1 and C2. Output inverter SW2–SW7, are pulse width modulated to create either an AC voltage or current. The output inverter PWM is filtered by output filter L4–L6, and C6–C8.

To accomplish PF correction and boosting, SW1 is turned 'ON' to force currents to flow through L1–L3 simultaneously thereby charging L1–L3. When SW1 is turned 'OFF', L1–L3 discharge via D7 into the storage capacitors C1 and C2. The control stage is depicted as an analog circuit although a microcontroller based approach could also be used.

The control is given a DC voltage command that, is summed with DC volts feedback at summing junction. The resulting DC voltage error signal is passed through the voltage PI gain amplifier stage, and then connected to the current limit block. The output of is summed with the DC current feedback signal at summing junction. The resulting current error signal is then passed through the current PI gain amplifier stage, the output of which is connected to the PWM stage. The output of the PWM stage is connected to the power switch gate driver, where the PWM signal is amplified, isolated and sent to the power switch SW1.

There are numerous variables, such as circuit Q, and fundamental output currents other than DC or 60 Hz, that will impact component values and gain selections. However, in one embodiment there are certain guidelines that provide a general method of approximation for selecting critical components and gain terms for a variety of dual boost applications, denoted values are for a 250 KVA application. DC Inductor selection criteria L1–L3: Inductance is between 5–10% impedance (at $I_{rated\ 60\ Hz}$). This provides a reasonable compromise between ripple current, large signal slew rate and minimum required control loop bandwidth. Lower THD due to cusp distortion can be accomplished by selecting impedance values near the low end of this range 5%. Conversely, ripple current reduction may be achieved, with a consequently higher cusp distortion, by selecting impedances near the high end of this range 10%.

$$V_{L-N}(0.05) < (I_{rated\ 60\ Hz})(j\omega L) < V_{L-N}(0.10) \quad [L=150\ \mu H]$$

Capacitor selection criteria C1 and C2: Capacitor value is selected to meet the required output ripple current ratings, as well as to limit the $V_{ripple\ 120\ Hz\ MAX}$ to the system rating.

$$V_{ripple\ 120\ Hz\ MAX} = (I_{rated\ 120\ Hz\ MAX})(1/j\omega C) \quad [C=14,400\ \mu F]$$

Voltage loop bandwidth: Voltage loop bandwidth is selected such that the boost LC circuit (L1 and C3) resonant pole is well within the voltage loop crossover frequency.

$$V_{Loop\ BW} > (\sim 3)(\tfrac{1}{2}\pi\sqrt{LC}) \quad [108\ Hz\ LC\ pole = 300\ Hz\ V_{Loop\ BW\ min}]$$

$$[Kv_P = R_2/R_1 = 16.0]$$

$$[Kv_I = 1/R_1{}^*C_f{}^*s(f)]$$

Current loop bandwidth: Generally, current loop bandwidth is selected such that the voltage loop crossover frequency is well within the current loop crossover frequency.

$$I_{Loop\ BW} > (\sim 2)(V_{Loop\ BW}) \quad [300\ Hz\ V_{Loop\ BW} = 600\ Hz\ I_{Loop\ BW\ min}]$$

$$[Ki_P = R_2/R_1 = 25]$$

$$[Ki_I = 1/R_1{}^*C_f{}^*s(f)]$$

Switching frequency selection: The PWM carrier or switching frequency should be as much as 10× greater than the current loop bandwidth for stable operation. In actual practice this value is typically required to be as low as possible (to reduce switching losses) with the actual components used (circuit Q etc).

$$F_{carrier} > (\sim 10)(V_{Loop\ BW}) \quad [600\ Hz\ I_{Loop\ BW} = 6000\ Hz\ F_{carrier\ min}]$$

It is readily apparent that the techniques of the present invention can be used in multiple methods and implementing in a variety of manners and is not limited to the embodiments presented herein. Various variations and modifications may be made without departing from the scope of the present invention Numerous characteristics and advantages have been set forth in the foregoing description, together with details of structures and functionality, and the novel features thereof are pointed out in appended claims. The disclosure, however, is illustrative only, and changes may be made in arrangement and details, within the principle of the invention, to the full extent indicated by the broad general meaning of the terms in which the appended claims are expressed.

The objects and advantages of the invention may be further realized and attained by means of the instrumentalities and combinations particularly pointed out in the appended claims. Accordingly, the drawing and description are to be regarded as illustrative in nature, and not as restrictive.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

No warranty is expressed or implied as to the actual degree of safety, security or support of any particular specimen of the invention in whole or in part, due to differences in actual production designs, materials and use of the products of the invention.

What is claimed is:

1. An AC voltage to DC voltage converter with improved power factor, said converter comprising:
    a single phase AC input;
    a pair of inductors each coupled in series to said AC input on a first end of said inductors;

a rectifier section coupled to said inductors on a second end of said inductors, wherein said rectifier section converts said AC voltage to said DC voltage; and a switch coupled in parallel to said rectifier section for modulating stored charge from said inductors to an output capacitor, with a diode connected in series to said output capacitor;

wherein the switch is controlled by a PWM management scheme that uses a switching frequency that is variable as a function of changing di/dt during zero crossings of said AC input and DC output voltage feedback.

2. The AC voltage to DC voltage converter according to claim 1, wherein said switch is coupled to a pulse width modulating controller that is adapted to carry out said PWM management scheme.

3. The AC voltage to DC voltage converter according to claim 2, wherein said pulse width modulating controller uses said DC output voltage feedback to provide boost synchronization of said AC input.

4. The AC voltage to DC voltage converter according to claim 2, wherein said pulse width modulating controller controls said switch to maintain said AC input within an upper tolerance band and a lower tolerance band.

5. The AC voltage to DC voltage converter according to claim 1, wherein the switching frequency varies as a function of the AC voltage with a minimum di/dt and maximum switching frequency occurring at a zero crossing.

6. The AC voltage to DC voltage converter according to claim 1, further comprising a processing section, wherein said processing section calculates a switching frequency correction factor using a tolerance band that tracks the AC voltage.

7. The AC voltage to DC voltage converter according to claim 1, further comprising a ripple filter section coupled to said AC input.

8. A circuit for converting an AC voltage into a DC voltage, said circuit comprising:

a three phase AC input;

three AC inductors having a first end and a second end, wherein said inductors are coupled in series on said first end to said AC input;

a rectifier section coupled to said inductors on said second end, wherein said rectifier section converts said AC voltage to said DC voltage;

a switch transferring stored charge from said inductors to an output capacitor through a series connected diode; and a pulse width modulator section configured with a PWM management scheme that uses a variable switching frequency to control the switch, said variable switching frequency being variable as a function of changing di/dt during zero crossings of said AC input and DC output voltage feedback.

9. The AC voltage to DC voltage converter according to claim 8, wherein said pulse width modulator section uses said DC output voltage feedback to provide boost synchronization of said AC input.

10. The AC voltage to DC voltage converter according to claim 8, wherein said pulse width modulator section maintains said AC input within a tolerance band.

11. The AC voltage to DC voltage converter according to claim 8, wherein said switching frequency varies as a function of the AC voltage with a minimum di/dt and maximum switching frequency occurring at a zero crossing.

12. The AC voltage to DC voltage converter according to claim 8, wherein the pulse width modulator section includes a processing section that is adapted to calculate a switching frequency correction factor using a tolerance band that tracks the AC voltage.

13. The AC voltage to DC voltage converter according to claim 8, further comprising a ripple filter section coupled to said three phase AC input.

14. A circuit for converting an AC voltage into a DC voltage, said circuit comprising:

a three phase AC input;

three AC inductors having a first end and a second end, wherein said inductors are coupled in series on said first end to said AC input;

a rectifier section coupled to said inductors on said second end, wherein said rectifier section converts said AC voltage to said DC voltage;

at least one switch transferring stored charge from said inductors to at least one output capacitor through a series connected diode; and a pulse width modulator section configured with a PWM management scheme that uses a variable switching frequency to control the at least one switch, said variable switching frequency being variable as a function of changing di/dt during zero crossings of said AC input and DC output voltage feedback.

15. The AC voltage to DC voltage converter according to claim 14, wherein said pulse width modulator section uses said DC output voltage feedback to provide boost synchronization of said AC input.

16. The AC voltage to DC voltage converter according to claim 14, wherein said pulse width modulator section maintains said AC input within a tolerance band.

17. The AC voltage to DC voltage converter according to claim 14, wherein said switching frequency from said pulse width modulator section varies as a function of the AC voltage with a minimum di/dt and maximum switching frequency occurring at a zero crossing.

18. The AC voltage to DC voltage converter according to claim 14, wherein the pulse width modulator section includes a processing section that is adapted to calculate a switching frequency correction factor using a tolerance band that tracks the AC voltage.

19. The AC voltage to DC voltage converter according to claim 14, wherein said three phase AC input is a three phase four wire input, and said circuit is a dual boost having two switches and two output capacitors with a common neutral therebetween, with each of the two switches independently controlled by a respective switching frequency thereby balancing voltage across the respective output capacitors.

20. The AC voltage to DC voltage converter according to claim 14, further comprising a ripple filter section coupled to said three phase AC input.

* * * * *